Feb. 17, 1959 P. J. W. JOCHEMS 2,874,232

TRANSISTOR ELEMENT AND TRANSISTOR CIRCUIT

Filed Feb. 1, 1954

INVENTOR
PIETER JOHANNES WILHELMUS JOCHEMS

BY [signature]

AGENT

United States Patent Office 2,874,232

Patented Feb. 17, 1959

2,874,232

TRANSISTOR ELEMENT AND TRANSISTOR CIRCUIT

Pieter Johannes Wilhelmus Jochems, Eindhoven, Netherlands, assignor, by mesne assignments, to North American Philips Company, Inc., New York, N. Y., a corporation of Delaware Application February 1, 1954, Serial No. 407,560

Claims priority, application Netherlands February 2, 1953

6 Claims. (Cl. 179—171)

This invention relates to transistor elements and circuits comprising a transistor element constituted by a semiconductive substantially flat crystal element of one conductivity in which zones of the other conductivity provided with connecting electrodes exist. Its object is more particularly to provide a transistor element adapted for use in amplifying circuits and it is characterized in that two such zones approach one another at a comparatively short distance, the one zone extending substantially to the one and the other extending substantially to the other of two opposing surfaces of the crystal element, whereas a third zone is comparatively thin and extends from one of said surfaces to the other.

In order that the invention may be readily carried into effect, it will now be described with reference to the accompanying drawing, given by way of example, in which.

Figure 1:
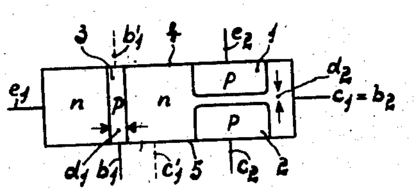
Fig. 1 shows a transistor element according to the invention.

The transistor element shown in Fig. 1 is constituted by a flat crystal element of one conductivity—for example a germanium crystal of the n-conductivity type having zones 1, 2 and 3 of the opposite conductivity and hence, in the example under consideration, of p-conductivity type. The zones 1 and 2 are spaced by a distance $d_2$, which is comparatively small and preferably smaller than the characteristic diffusion length of the minority charge carriers in the intermediate crystal material. These zones extend to opposing surfaces 4 and 5, respectively, of the crystal element and are provided with connecting electrodes $e_2$ and $c_2$ respectively. Furthermore, a third zone 3 of opposite conductivity is provided which extends from the one surface 4 to the other 5 and has a thickness $d_1$ which is also preferably smaller than the characteristic diffusion length of the minority charge carriers in zone 3.

Figure 2:
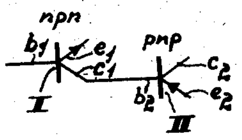
Fig. 2 is the equivalent diagram of the transistor of Fig. 1.

The zone 3 is provided with a connecting electrode $b_1$, and the parts separated by the zone 3, are provided with connecting electrodes $e_1$ and $c_1=b_2$ respectively. The electrodes $e_1$, $b_1$ and $c_1$ serve as the emitter—the base—and the collecter electrode of a first transistor which is indicated by I in the equivalent diagram of Fig. 2, the electrodes $e_2$, $b_2$ and $c_2$ serving as similar electrodes of a second transistor II, (Fig. 2).

The functions of the electrodes $e_1$, $c_1$ and $e_2$, $c_2$ respectively may be changed, if necessary, as will appear from the circuits which will be described hereinafter. If the functions of the electrodes are chosen in the manner illustrated in Fig. 1, the n-material which is connected to the electrode $e_1$ preferably has a comparatively low specific resistance and the n-material which is connected to the electrode $c_1$ preferably has a comparatively high specific resistance. If, however, the functions of the electrodes $e_1$ and $c_1$ are changed, the values of the specific resistance will preferably also be changed.

Since the connecting electrodes $c_1$ and $b_2$ are common, the electrode $c_1=b_2$ may be omitted under certain conditions, for example in the circuit shown in Fig. 3 which will be described hereinafter. On the other hand, it may under certain conditions be preferable that the zone 3 should be provided with a second connecting electrode $b_1'$, so that it becomes possible, as is well-known, to amplify comparatively high signal frequencies. Furthermore, it is possible, if desired, to connect instead of, or in addition to the electrode $c_1$ another electrode $c_1'$ to the n-portion between the zones 1, 2 and 3.

The transistor element shown in Fig. 1 may be manufactured, for example, by the so-called grown junction method in which the crystal is grown by withdrawing the successively formed portions thereof from a molten mass of semi-conductive material, for example germanium or silicon, and varying the conductivity of the molten mass during the growing process so as to obtain the zone 3. Thereafter zones 1 and 2 may be formed by doping the crystal with a suitable material, for example indium, which material, after being heated during a prescribed period at a temperature of, for example, 500° C., produces the zones 1 and 2.

Figure 3:
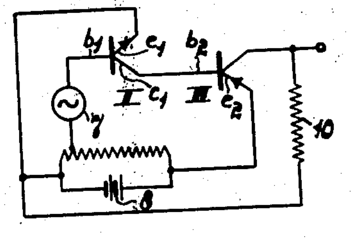
Figs. 3 and 4 show two amplifying circuits each comprising such a transistor element.

Fig. 3 shows an amplifying circuit comprising a transistor element I, II of Figs. 1 and 2 which is suitable for signal frequencies down to the frequency zero. A signal source 7 is here connected between the base electrode $b_1$ and an intermediate voltage point of a supply voltage source 8, one terminal of which is connected to the emitter electrode $e_1$ and the other terminal of which is connected to the emitter electrode $e_2$. The intermediate voltage point may be decoupled, if desired, by a capacitor (not shown). An amplified signal current thus flowing from the collector electrode $c_1$ to the base electrode $b_2$ produces a further amplified signal across an output impedance 10 included in the circuit of the collector electrode $c_2$. It is to be noted that the supply voltage source 8 is included in that series-circuit which connects the first zone 1 by way of the electrode $e_2$ to the third zone P by way of the electrode $b_1$, the blocking layer between the one zone (1) and the crystal material being operated in the forward direction and that between the other zone (3) and the crystal material being operated in the blocking direction, in which event a separate connecting electrode $c_1=b_2$ on the transistor elements I, II may be omitted.

Figure 4:
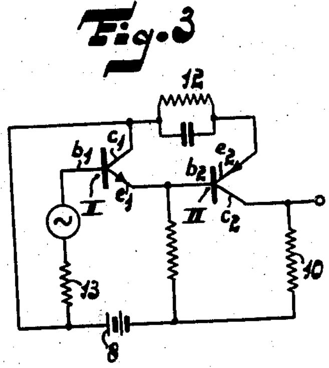

Fig. 4 shows another amplifying circuit which is adapted more particularly for obtaining comparatively high input and output impedances of the transistor. For this purpose the functions of the electrodes shown in Fig. 1 as $e_1$ and $c_1$ are interchanged, as above indicated, so that the electrode $c_1$ now becomes the isolated electrode of the left-hand transistor system and the electrode $e_1$ becomes a common electrode with $b_2$ of the right-hand transistor system. The signal source 7 is connected, as before, to the base electrode $b_1$, but now the collector electrode $c_1$ is connected to one terminal and the collector electrode $c_2$ is connected by way of the output impedance 10 to the other terminal of the supply voltage source 8, the emitter electrode $e_2$ being connected to the first-mentioned terminal by way of a resistor 12 which, if desired, may be bypassed. The internal resistance 13 of the signal source provides the correct biasing potential at the base electrode $b_1$, the current from the electrodes $e_1$ and $b_2$ which comprise a common connecting electrode flowing by way of a comparatively high resistance back to the source 8.

The transistor portion I is thus connected as a "grounded collector"-amplifier which, as is well-known, has a comparatively high input impedance, whereas the transistor portion II is connected as a "grounded emitter" amplifier which, as is well known, has a comparatively high output impedance.

What is claimed is:

1. A transistor device comprising a body having first and second portions of semi-conductive material of one conductivity type, said first portion being provided with two opposing surfaces, two zones of material of opposite conductivity type arranged within said first portion and in spaced opposing relationship and each extending to a respective one of said surfaces, a third zone of material of said opposite conductivity type interposed between said first and second portions and extending between said opposing surfaces, said first-mentioned two zones and said first portion constituting a first transistor system and said third zone and said first and second portions constituting a second transistor system.

2. A transistor device comprising a body having first and second portions of semi-conductive material of one conductivity type, said first portion being provided with two opposing substantially parallel planar surfaces, two zones of material of opposite conductivity type arranged within said first portion in spaced opposing relationship and each extending to a respective one of said surfaces, a third substantially planar zone of material of said opposite conductivity type interposed between said first and second portions, said third zone extending between said opposing surfaces substantially normal thereto, and electrode connection members in contact with said zones and said second portion, said first-mentioned two zones and said first portion constituting a first transistor system, and said third zone and said first and second portions constituting a second transistor system.

3. A transistor device comprising a body having first and second portions of N-type semi-conductive material, said first portion being provided with two opposing substantially parallel planar surfaces, two zones of P-type material arranged within said first portion in spaced opposing relationship and each extending to a respective one of said surfaces, a third zone of P-type material interposed between said first and second portions, said third zone extending between said opposing surfaces substantially normal thereto, and electrode connection members in contact with said zones and said second portion, said first-mentioned two zones and said first portion constituting a first transistor system and said third zone and said first and second portions constituting a second transistor system.

4. A transistor translating device comprising a body having first and second portions of semi-conductive material of one conductivity type, said first portion being provided with two opposing surfaces, two zones of material of opposite conductivity type arranged within said first portion in spaced oppositing relationship and each extending to a respective one of said surfaces, a third zone of material of said opposite conductivity type interposed between said first and second portions and extending between said opposing surfaces, electrode connection members in contact with said zones and said second portions, and means including a voltage source connected between one of said first-mentioned two zones and said second portion.

5. A transistor translating device comprising a body having first and second portions of semi-conductive material of one conductivity type, said first portion being provided with two opposing surfaces, first and second zones of material of opposite conductivity type arranged within said first portion in spaced opposing relationship and each extending to a respective one of said surfaces, a third zone of material of said opposite conductivity type interposed between said first and second portions and extending between said opposing surfaces, electrode connection members in contact with said first, second and third zones and said second portion and defining therewith respectively, a first emitter electrode, a collector electrode, a base electrode and a second emitter electrode, means including a voltage source connected between said first and second emitter electrodes, means for connecting said source to said base electrode, a signal source connected to said base electrode, and an output impedance connected to said collector electrode.

6. A transistor translating device comprising a body having first and second portions of semi-conductive material of one conductivity type, said first portion being provided with two opposing surfaces, first and second zones of material of opposite conductivity type arranged within said first portion in spaced opposing relationship and each extending to a respective one of said surfaces, a third zone of material of said opposite conductivity type interposed between said first and second portions, and extending between said opposing surfaces, electrode connection members in contact with said first, second and third zones and said second portion and defining therewith respectively, a first emitter electrode, a first collector electrode, a base electrode and a second collector electrode, means including a voltage source connected between said collector electrodes, means for connecting said source to said base and emitter electrodes, a signal source connected to said base electrode, and an output impedance connected to said first collector electrode.

References Cited in the file of this patent

UNITED STATES PATENTS

| | | |
|---|---|---|
| 2,569,347 | Shockley | Sept. 25, 1951 |
| 2,586,080 | Pfann | Feb. 19, 1952 |
| 2,600,500 | Haynes et al. | June 17, 1952 |
| 2,623,102 | Shockley | Dec. 23, 1952 |
| 2,655,609 | Shockley | Oct. 13, 1953 |
| 2,655,610 | Ebers | Oct. 13, 1953 |
| 2,663,806 | Darlington | Dec. 22, 1953 |
| 2,663,830 | Oliver | Dec. 22, 1953 |
| 2,666,814 | Shockley | Jan. 19, 1954 |